United States Patent [19]
Massinger

[11] 3,784,180
[45] Jan. 8, 1974

[54] STABILIZER BAR LINK
[76] Inventor: Alvin G. Massinger, 426 Church Ln., Yeadon, Pa. 19050
[22] Filed: May 17, 1972
[21] Appl. No.: 254,187

[52] U.S. Cl. .............................. 267/66, 267/63 A
[51] Int. Cl. ............................................ B60q 25/00
[58] Field of Search ............... 267/66, 63 R, 63 A

[56] References Cited
UNITED STATES PATENTS
2,367,817   1/1945   Brown .................................. 267/66
2,888,271   5/1959   Butterfield .......................... 267/66

Primary Examiner—James B. Marbert

[57] ABSTRACT

A stabilizer bar link device for vehicles such as trucks, buses, and automobiles. This device consists primarily of a structure of which the rubber bushings are replaceable on the stud portion of the device.

3 Claims, 3 Drawing Figures

STABILIZER BAR LINK

This invention relates to sway and roll prevention devices, and more particularly to a stabilizer bar link for automotive vehicles.

It is therefore the primary purpose of this invention to provide a stabilizer bar link which will be of such structure, so as to have replacable rubber bushings, thus preventing the former necessity of disgarding the entire stabilizer bar link of the prior art.

Another object of this invention is to provide a link device which will last the life of the vehicle it is placed upon, thus cutting down the cost of replacing entire links.

A further object of this invention is to provide a link device which will include a stud portion and a pair of bushing portions which will be received by the stud portions, the combination being held together by means of nut fasteners.

Other objects of the present invention are to provide a stabilizer bar link which is simple in design, inexpensive to manufacture, rugged in construction, easy to use and efficient in operation.

These and other objects will be readily evident upon a study of the following specification and the accompanying drawing wherein.

Figure 1:
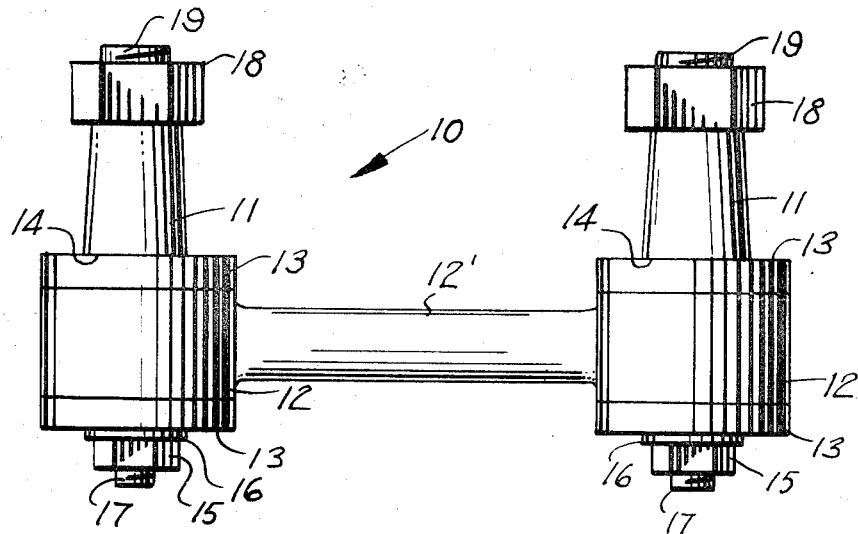
FIG. 1 is a vertical view of the present invention shown in elevation.
Figure 2:
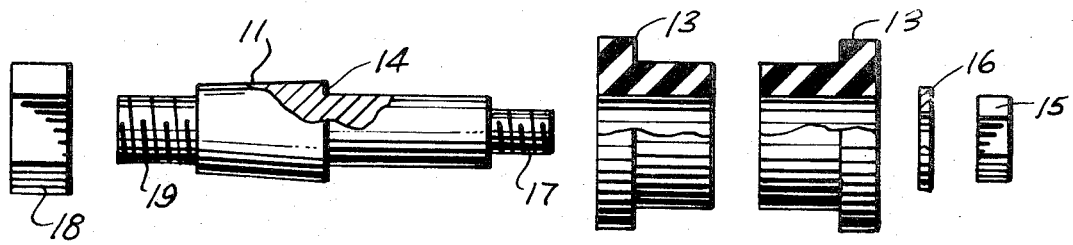
FIG. 2 is an exploded view of one of the cylindrical assemblies of FIG. 1.

According to this invention, a stabilizer bar link 10 is shown to include a pair of studs 11 received within cylindrical portions 12 which are connected, one to each end of bar 12'. A pair of rubber bushings 13 are received on the studs 11, one abutting with the shoulder 14 of stud 11 and bushings 13 are held securely there to by means of a nut fastener 15 engaged to washer 16 upon the threaded end 17, the opposite end of stud 11 receiving a nut fastener 18 upon its threaded end 19.

In use, the bushings 13 when worn are replacable by removing the nut fastener 15 from the threaded end 17 of stud 11 and the bushings 13 are replaced by new ones.

Figure 3:
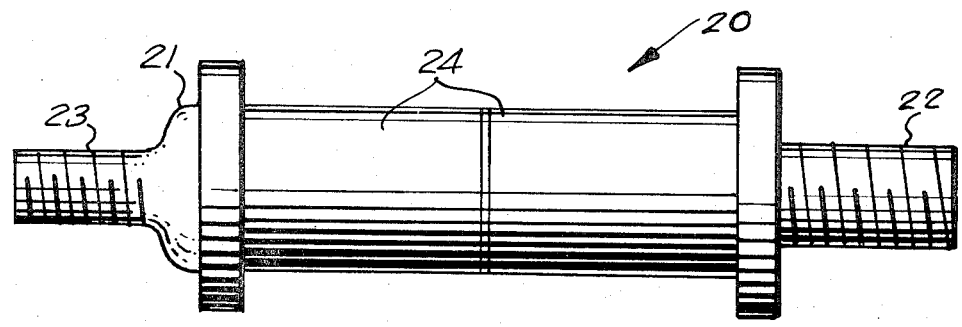
FIG. 3 is a horizontal view showing a modified form of the invention.

Referring now to FIG. 3 of the drawing, one will see a modified form of stabilizer link 20 which includes a stud portion 21 having a threaded end 22 and a threaded end 23 for receiving suitable nut fasteners and stud 21 removably receives a pair of bushings 24.

The link 20 is used primarily upon the front and rear ends of buses and trucks and the front links on a bus are connected to the frame and stabilizer bar.

It shall be noted that the purpose of the present invention is to absorb and correct the sway and roll of the vehicle.

What I now claim is:

1. A stabilizer bar link for automotive Vehicles for connecting the sway and roll of said vehicle, comprising a pair of stud members, a member having a cylindrical portion at each end, (carried by said stud member) with connecting bar means, each cylindrical portion removably connected to a stud member, a pair of replacable rubber bushings with enlarged heads placed on the inner and outer side of each cylindrical portion with the head of the inner bushing abutting a shoulder formed on the stud and the head of the outer bushing being connected to the stud, by a washer and nut fastener for (Carried by said device for absorbing the motion, a nut fastener and washer carried by said stud providing a means of) retaining said bushings.

2. The combination according to claim 1, (wherein said cylindrical portion of said device are connected by bar means between the two), wherein said bar means serving as spacing means for said cylinders, (and said studs are carried within said cylinders and receive said removable rubber bushings, one of said rubber bushings abutting with a shoulder of said studs carrying said bushings and the opposite rubber bushings abutts with a washer received upon the threaded and adjacent to one of said bushings and said nut fastener is threaded on the two threaded ends so as to abutt with said washer which abutts with said removable rubber bushing which faces in the opposite direction of the opposite rubber bushing abutting against the shoulder of said stud.)

3. The combination according to claim 1, wherein said stud includes a tapered portion which is of larger diameter than the main body of said stud, said tapered portion providing the shoulder means against which one of said rubber bushings abutts with.

* * * * *